United States Patent
Baek et al.

(10) Patent No.: US 12,153,657 B2
(45) Date of Patent: Nov. 26, 2024

(54) METHOD AND APPARATUS WITH ACCESS AUTHORITY MANAGEMENT

(71) Applicant: Samsung Electronics Co., Ltd., Suwon-si (KR)

(72) Inventors: Jiwon Baek, Hwaseong-si (KR); Seungju Han, Seoul (KR); Kikyung Kim, Hwaseong-si (KR); Insoo Kim, Seongnam-si (KR); Jaejoon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 345 days.

(21) Appl. No.: 17/671,747

(22) Filed: Feb. 15, 2022

(65) Prior Publication Data

US 2023/0037263 A1    Feb. 2, 2023

(30) Foreign Application Priority Data

Jul. 29, 2021   (KR) .......................... 10-2021-0099877

(51) Int. Cl.
*G06F 21/00*       (2013.01)
*G06F 21/32*       (2013.01)
(Continued)

(52) U.S. Cl.
CPC ............ *G06F 21/32* (2013.01); *G06V 10/761* (2022.01); *G06V 10/7715* (2022.01);
(Continued)

(58) Field of Classification Search
CPC ..... G06F 21/32; H04L 9/3234; G06V 40/168; G06V 40/172
See application file for complete search history.

(56) References Cited

U.S. PATENT DOCUMENTS 10,546,183 B2    1/2020   Rodriguez et al.
2018/0060680 A1*  3/2018   Alon ........................ G06F 21/32
(Continued)

FOREIGN PATENT DOCUMENTS

EP   1635307 A1 *  3/2006 ......... G06K 9/00288
JP   2005-242432 A    9/2005
(Continued)

OTHER PUBLICATIONS

Bamunuge, H. K. T., et al. "E-Learn Detector: Smart Behaviour Monitoring System to Analyze Student Behaviours During Online Educational Activities." 2021 3rd International Conference on Advancements in Computing (ICAC). IEEE, 2021. pp. 19-24.
(Continued)

*Primary Examiner* — Jeffrey C Pwu
*Assistant Examiner* — Thong P Truong
(74) *Attorney, Agent, or Firm* — NSIP Law

(57) ABSTRACT

A method with access authority management includes: receiving an input image comprising a region of at least one portion of a body of a user; determining whether the user
(Continued)

corresponds to multiple users or a single user using the region of the at least one portion of the body; performing a verification for the user based on a face region in the input image, in response to the determination that the user is the single user; determining whether the input image is a real image or a spoofed image based on whether the verification is successful; and allowing an access authority to a system to the user, in response to the determination that the input image is the real image.

35 Claims, 12 Drawing Sheets

(51) Int. Cl.
  *G06V 10/74* (2022.01)
  *G06V 10/77* (2022.01)
  *G06V 10/82* (2022.01)
  *G06V 40/16* (2022.01)
  *G06V 40/40* (2022.01)
(52) U.S. Cl.
  CPC ............ *G06V 10/82* (2022.01); *G06V 40/168* (2022.01); *G06V 40/172* (2022.01); *G06V 40/40* (2022.01)

(56) References Cited

U.S. PATENT DOCUMENTS

| | | | |
|---|---|---|---|
| 2021/0076002 A1* | 3/2021 | Peters | H04N 7/152 |
| 2021/0200992 A1* | 7/2021 | Padmanabhan | G06V 40/45 |

FOREIGN PATENT DOCUMENTS

| | | |
|---|---|---|
| JP | 2009-211381 A | 9/2009 |
| JP | 2018-97866 A | 6/2018 |
| JP | 2020-21395 A | 2/2020 |
| JP | 6691309 B2 | 4/2020 |
| JP | 2021-36441 A | 3/2021 |
| KR | 10-0489944 B1 | 5/2005 |
| KR | 10-2009-0018440 A | 2/2009 |
| KR | 10-2018-0116866 A | 10/2018 |
| WO | WO 2018/009568 A1 | 1/2018 |

OTHER PUBLICATIONS

Elordi, Unai, et al. "Optimal deployment of face recognition solutions in a heterogeneous IoT platform for secure elderly care applications." Procedia Computer Science 192 (2021): 3204-3213.
Extended European search report issued on Dec. 21, 2022, in counterpart European Patent Application No. 22184145.5 (42 pages in English).

* cited by examiner

METHOD AND APPARATUS WITH ACCESS AUTHORITY MANAGEMENT

CROSS-REFERENCE TO RELATED APPLICATIONS

This application claims the benefit under 35 USC § 119(a) of Korean Patent Application No. 10-2021-0099877, filed on Jul. 29, 2021 in the Korean Intellectual Property Office, the entire disclosure of which is incorporated herein by reference for all purposes.

BACKGROUND

1. Field

The following description relates to a method and apparatus with access authority management.

2. Description of Related Art

The introduction of non-face-to-face meetings and/or telecommuting has been boosted by COVID-19. As a result, systems for providing a work environment for telecommuting equivalent to office work have been actively established. The expansion of the scope of allowance of access authority to a system for more efficient telecommuting environments increases the accessibility to various work data and the risk of leak of confidential information as well.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method with access authority management includes: receiving an input image comprising a region of at least one portion of a body of a user; determining whether the user corresponds to multiple users or a single user using the region of the at least one portion of the body; performing a verification for the user based on a face region in the input image, in response to the determination that the user is the single user; determining whether the input image is a real image or a spoofed image based on whether the verification is successful; and allowing an access authority to a system to the user, in response to the determination that the input image is the real image.

The determining of whether the user corresponds to the multiple users or the single user may include determining whether the user corresponds to the multiple users or the single user based on any one or any combination of any two or more of a number of the region of the at least one portion of the body, a color of the region of the at least one portion of the body, a position of disposition of the region of the at least one portion of the body compared to a position of the face region, an angle of disposition, and a size ratio of the region of the at least one portion of the body to the face region.

The performing may include: extracting a feature vector of the face region from the input image; and performing the verification for the user based on a result of comparing a similarity score between the feature vector of the face region and an enrolled feature vector stored in an enrollment database to a verification threshold.

The method may include adjusting the verification threshold according to a security level corresponding to the system, wherein the performing may include performing the verification for the user according to whether the similarity score is greater than the adjusted verification threshold.

The determining of whether the input image is the real image or the spoofed image may include: extracting an output feature vector of a neural network for detecting whether the face region is spoofed from the input image; calculating a score based on the output feature vector; and determining whether the input image is the real image or the spoofed image according to whether the score falls within a threshold range for determining whether the input image is spoofed.

The method may include adjusting the threshold range according to a security level corresponding to the system, wherein the determining of whether the input image is the real image or the spoofed image may include determining whether the input image is the real image or the spoofed image according to whether the score falls within the adjusted threshold range.

The method may include: determining whether a preset type of capturing device is detected in the input image; and blocking an access authority of the user to the system in response to the determination that the preset type of capturing device is detected.

The method may include: determining whether an abnormal situation is detected in a second input image received after the access authority is allowed, the abnormal situation including any one or any combination of any two or more of another user other than the authorized user, the preset type of capturing device, and a capturing action using the capturing device; and blocking an access authority to the system in response to the determination that an abnormal situation is detected.

The determining of whether the abnormal situation is detected may include determining whether the other user is detected based on whether a plurality of face regions are detected in the second input image.

The determining of whether the abnormal situation is detected may include determining whether an object corresponding to the preset type of capturing device is detected in the second input image.

The determining of whether the abnormal situation is detected may include determining whether the capturing action, being of the user and corresponding to the preset type of capturing device, is detected in the second input image.

The determining of whether the capturing action of the user is detected may include determining whether the capturing action of the user is detected based on whether any one or any combination of any two or more of a pose of the user facing a screen provided through the system, a gesture of the user, a position of the capturing device corresponding to the screen, and consecutive motions of the user using the capturing device in the second input image corresponds to a motion predetermined as a capturing action.

The method may include guiding the user to transmit an image of a space outside a field of view corresponding to the input image by rotating a capturing device used to capture the input image and capturing the space, according to a security level corresponding to the system.

The method may include verifying whether the input image is captured by a capturing device with a polarizing film attached to narrow a field of view.

The verifying may include verifying, in response to the user wearing glasses, whether the input image is captured by a capturing device with a polarizing film attached to narrow a field of view, based on either one or both of a pattern and a color reflected on a lens of the glasses corresponding to the input image.

The receiving of the input image may include either one or both of: receiving the input image according to a preset time interval; and receiving the input image according to a random time interval.

The input image may include an image obtained by capturing a working situation of the user who is telecommuting.

In another general aspect, one or more embodiments include a non-transitory computer-readable storage medium storing instructions that, when executed by a processor, configure the processor to perform any one, any combination, or all operations and methods described herein.

In another general aspect, a method with access authority management includes: receiving an input image obtained by capturing at least one portion of a body of a user; determining whether the user corresponds to multiple users or a single user using the at least one portion of the body; determining whether the input image is a real image or a spoofed image using a face region in the input image, in response to the determination that the user is the single user;
performing a verification for the user by the face region, in response to the determination that the input image is the real image; and allowing an access authority to a system to the user based on whether the verification is successful.

In another general aspect, an apparatus with access authority management includes: a communication interface configured to receive an input image comprising a region of at least one portion of a body of a user; and a processor configured to: determine whether the user corresponds to multiple users or a single user using the region of the at least one portion of the body; perform a verification for the user based on a face region in the input image, in response to the determination that the user is the single user; determine whether the input image is a real image or a spoofed image based on whether the verification is successful; and allow an access authority to a system to the user, in response to the determination that the input image is the real image.

For the determining of whether the user corresponds to the multiple users or the single user, the processor may be configured to determine whether the user corresponds to the multiple users or the single user based on any one or any combination of any two or more of a number of the region of the at least one portion of the body, a color of the region of the at least one portion of the body, a position of disposition of the region of the at least one portion of the body compared to a position of the face region, an angle of disposition, and a size ratio of the region of the at least one portion of the body to the face region.

For the performing, the processor may be configured to: extract a feature vector of the face region from the input image; and perform the verification for the user based on a result of comparing a similarity score between the feature vector of the face region and an enrolled feature vector stored in an enrollment database to a verification threshold.

The processor may be configured to: adjust the verification threshold according to a security level corresponding to the system; and for the performing, perform the verification for the user according to whether the similarity score is greater than the adjusted verification threshold.

For the determining of whether the input image is the real image or the spoofed image, the processor may be configured to: extract an output feature vector of a neural network for detecting whether the face region is spoofed from the input image; calculate a score based on the output feature vector; and determine whether the input image is the real image or the spoofed image according to whether the score falls within a threshold range for determining whether the input image is spoofed.

The processor may be configured to: adjust the threshold range according to a security level corresponding to the system; and for the determining of whether the input image is the real image or the spoofed image, determine whether the input image is the real image or the spoofed image according to whether the score falls within the adjusted threshold range.

The processor may be configured to: determine whether a preset type of capturing device is detected in the input image; and block an access authority of the user to the system in response to the determination that the preset type of capturing device is detected.

The processor may be configured to: determine whether an abnormal situation is detected in a second input image received after the access authority is allowed, the abnormal situation including any one or any combination of any two or more of another user other than the authorized user, the preset type of capturing device, and a capturing action using the capturing device; and block an access authority to the system in response to the determination that an abnormal situation is detected.

For the determining of whether the abnormal situation is detected, the processor may be configured to determine whether the other user is detected based on whether a plurality of face regions are detected in the second input image.

For the determining of whether the abnormal situation is detected, the processor may be configured to determine whether an object corresponding to the preset type of capturing device is detected in the second input image.

For the determining of whether the abnormal situation is detected, the processor may be configured to determine whether the capturing action, being of the user and corresponding to the preset type of capturing device, is detected in the second input image.

For the determining of whether the capturing action of the user is detected, the processor may be configured to determine whether the capturing action of the user is detected, based on whether any one or any combination of any two or more of a pose of the user facing a screen provided through the system, a gesture of the user, a position of the capturing device corresponding to the screen, and a motion of the user using the capturing device in the second input image corresponds to a motion suspected as a capturing action.

The processor may be configured to guide the user to transmit an image of a space outside a field of view corresponding to the input image by rotating a capturing device used to capture the input image and capturing the space, according to a security level corresponding to the system.

The processor may be configured to verify whether the input image is captured by a capturing device with a polarizing film attached to narrow a field of view.

The processor may be configured to verify, in response to the user wearing glasses, whether the input image is captured by a capturing device with a polarizing film attached to narrow a field of view, based on either one or both of a pattern and a color reflected on a lens of the glasses corresponding to the input image.

For the receiving of the input image, the processor may be configured to receive either one or both of the input image according to a preset time interval and the input image according to a random time interval.

In another general aspect, a method with access authority management includes: receiving an image comprising a user; determining whether either one or both of a portion of a body of another user and a capturing action is included in the image; and performing an access authority operation to a system based on a result of the determining.

The determining may include determining that either one or both of the portion of the body of the other user and the capturing action is included in the image, and the performing of access authority operation may include blocking an access authority to the system in response to the result of the determining.

The determining may include determining whether a respective preset threshold value is exceeded by any of a number of a type of body part included in the image, a color difference between body parts included in the image, a position difference between the body parts, and a size ratio of the body parts.

The determining may include either one or both of: determining whether the capturing action is included in the image; and determining whether a preset type of capturing device corresponding to the capturing action is included in the image.

The determining may include determining that either one or both of the portion of the body of the other user and the capturing action is included in the image, and the method may include excluding the image from an enrollment operation in response to the result of the determining.

Other features and aspects will be apparent from the following detailed description, the drawings, and the claims.

Figure 1:
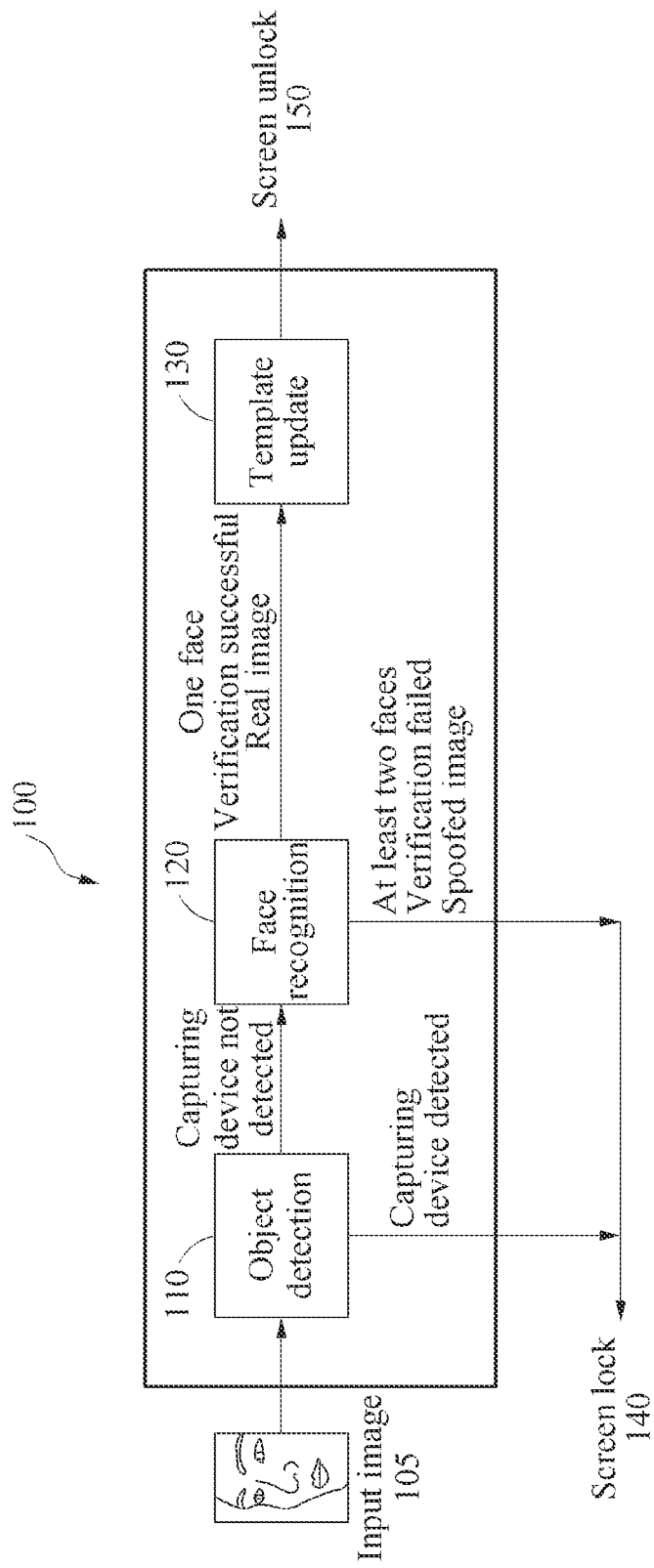
FIG. 1 illustrates an example of an overview of an apparatus for managing an access authority.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, each of expressions, for example, "between" and "immediately between" and "adjacent to" and "immediately adjacent to," should also be respectively construed in the same way. As used herein, the term "and/or" includes any one and any combination of any two or more of the associated listed items.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof. The use of the term "may" herein with respect to an example or embodiment (e.g., as to what an example or embodiment may include or implement) means that at least one example or embodiment exists where such a feature is included or implemented, while all examples are not limited thereto.

Unless otherwise defined, all terms used herein including technical or scientific terms have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

Hereinafter, examples will be described in detail with reference to the accompanying drawings. When describing the examples with reference to the accompanying drawings, like reference numerals refer to like components and a repeated description related thereto will be omitted.

FIG. 1 illustrates an example of an overview of an apparatus for managing an access authority. Operations shown in FIG. 1 are not necessarily to be sequentially arranged as illustrated. According to examples, the operations may be performed in different orders, and at least two of the operations may be performed in parallel.

Referring to FIG. 1, a process of performing screen unlock or maintaining screen lock by an apparatus 100 for managing an access authority (hereinafter, the "management apparatus" 100) through a determination of whether a user corresponding to an input image 105 is a user having an access authority to a system is illustrated.

The management apparatus 100 may be, for example, a telecommuting management system itself that manages telecommuting situations of users, or a management apparatus separate from the telecommuting management system.

The management apparatus 100 may be intended to enhance the security of the telecommuting management system, and may allow the access of a user whose access to the telecommuting management system is authorized ("authorized user") and block the access of user(s) whose access is not authorized ("unauthorized user(s)"). The management apparatus 100 may provide an access authority to a system (e.g., the telecommuting management system) to a user by determining whether the user is an authorized user or an unauthorized user by utilizing unique biometric information (e.g., face) of the user.

Also, the management apparatus 100 may block an access to the system by detecting an unauthorized user, a capturing device, and/or a capturing action using a capturing device from the input image 105. For example, after an authorized user accesses the telecommuting management system, the management apparatus 100 may detect from the received input image 105 that the authorized user is with another user (an unauthorized user) in the same space or that the authorized user performs a capturing action using a capturing device. In this case, the management apparatus 100 may determine that the detection result (e.g., the detection of an unauthorized user, the detection of a capturing device, and/or the detection of a capturing action) corresponds to an abnormal situation of information leakage attempt and thus, may block an access authority of the authorized user to the telecommuting management system.

The management apparatus 100 may, for example, perform object detection process 110, face recognition process 130, and template update process 150.

For example, the management apparatus 100 may receive an input image 105. The input image 105 may include, for example, at least one portion of a body of an authorized user A and/or another object.

In object detection process 110, the management apparatus 100 may detect the object from the input image 105. Here, the object may correspond to, for example, a body part such as a face, a hand or an arm of a person, and may also include a capturing device such as a camera and/or a user device such as a smartphone or a laptop computer. However, examples are not necessarily limited thereto.

The management apparatus 100 may detect a capturing device such as a camera or a smartphone, in addition to at least one portion of a body of the authorized user A (e.g., a face of the user A) from the input image 105. The management apparatus 100 may detect the capturing device according to, for example, the shape of the capturing device and/or how the capturing device is used included in the input image 105. However, examples are not necessarily limited thereto.

When an object such as a capturing device is detected from the input image 105 in object detection process 110, the management apparatus 100 may block an access authority to the system granted to the user A. The management apparatus 100 may perform screen lock 140 to lock the screen provided to the user A as the access authority of the user A is blocked.

When the capturing device is not detected in object detection process 110, the management apparatus 100 may verify through face recognition process 120 whether at least two faces are detected in the input image 105 and/or whether at least one portion of the body of the user detected in the input image 105 corresponds to a face region of the authorized user (the user A).

In face recognition process 120, the management apparatus 100 may determine whether the number of face regions included in the input image 105 is greater than or equal to "2", that is, whether at least two faces are detected. In response to the determination that the number of face regions included in the input image 105 is "1", the management apparatus 100 may verify whether the face included in the input image 105 is the face of the authorized user A. According to an example, in face recognition process 120, the management apparatus 100 may determine whether the input image 105 is a real image or a spoofed image.

For example, when at least two faces are detected in the input image 105, the management apparatus 100 may determine that a verification for the face region of the user A included in the detected region of at least one portion of the body of the user is failed and/or may determine that the face of the user A is not a real image but a spoofed image. When the management apparatus 100 determines that the verification is failed and/or the face of the user A is the spoofed image, the management apparatus 100 may block the access authority for the system granted to the user A (e.g., the management apparatus 100 may perform screen lock 140 to lock the screen provided to the user A).

When the verification for the input image 105 is successful through face recognition process 120 and it is determined that the input image 105 is a real image, the management apparatus 100 may perform template update process 130.

Object detection process 110 and face recognition process 130 may be performed in various manners, non-limiting examples of which will be described in more detail with reference to FIGS. 3 to 11.

In template update process 150, the management apparatus 100 may update template(s) stored in an enrollment database (DB) based on the input image 105. Templates may correspond to enrolled images of the user A. In template update process 150, the management apparatus 100 may update the templates by newly enrolling the input image 105 as an enrolled image in the enrollment DB or replacing an enrolled image stored in the enrollment DB with the input image 105. A non-limiting example of the process of enrolling an input image in the enrollment DB by the management apparatus 100 will be described in more detail with reference to FIG. 2.

When the update of the templates is completed through template update process 150, the management apparatus 100 may allow an access authority to the system to the user A (e.g., the management apparatus 100 may perform screen unlock 150 to unlock the screen provided to the user A). According to an example, when the verification for the input image 105 is successful through face recognition process 120 and it is determined that the input image 105 is a real image, the management apparatus 100 may allow an access authority to the system to the user A in response to the completion of face recognition process 120, prior to updating the templates.

Figure 2:
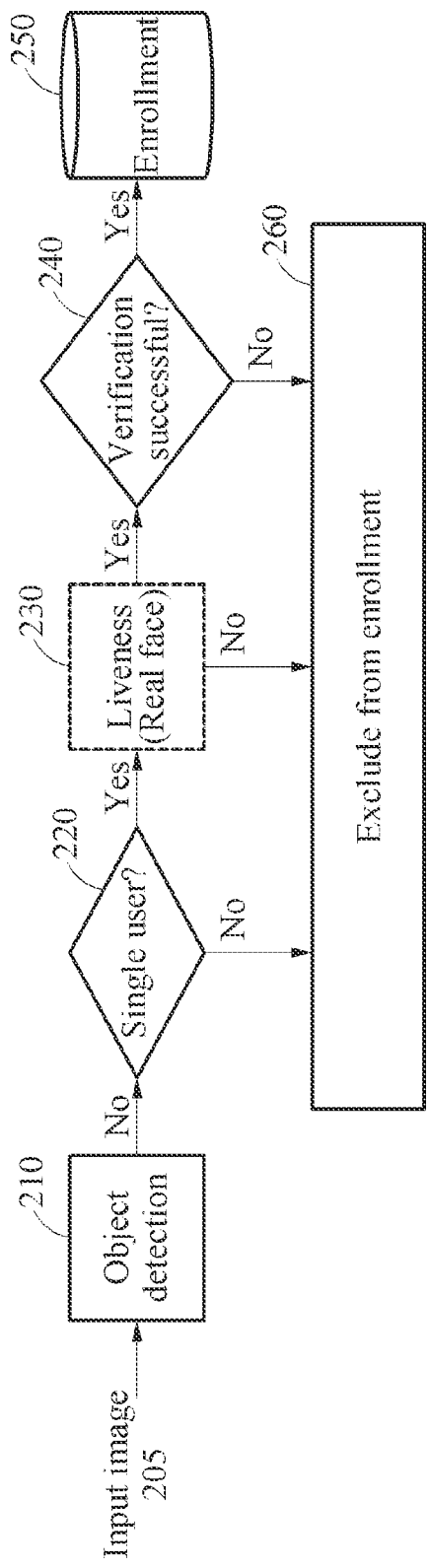
FIG. 2 illustrates an example of a process of enrolling an enrolled image for user verification by a management apparatus.

FIG. 2 illustrates an example of a process of enrolling an enrolled image for user verification by a management apparatus. Referring to FIG. 2, a process of enrolling an input image 205 of a user as an enrolled image in an enrollment DB by a management apparatus is illustrated.

For example, when an input image 205 captured by a webcam or a camera is received, the management apparatus may detect objects from the input image 205, in operation 210. The management apparatus may detect, for example, whether a region of at least one portion of a body of the user, a capturing device, and/or a face is included, from the input image 205. The input image 205 may be, for example, a two-dimensional image including a face region of the user and/or a region of at least one portion of the body of the user. However, examples are not necessarily limited thereto.

The management apparatus may detect the region of at least one portion of the body of the user, the capturing device, and/or the face using a neural network. The neural network may be, for example, pre-trained to detect a region of at least one portion of a user, a capturing device, and/or a face. The neural network may determine the number and positions of objects included in the input image 205 through bounding boxes corresponding to classes of the respective objects and transmit the determined number and positions of the objects to the management apparatus.

The management apparatus may determine whether a preset type of capturing device is among the objects detected in operation 210. In response to the determination that a preset type of capturing device is detected in operation 210, the management apparatus may exclude the input image 205 from enrollment in operation 260.

In response to the determination that a preset type of capturing device is not detected in operation 210, the management apparatus may determine whether the detected object is a single user, in operation 220. When it is determined in operation 220 that the detected object is not a single user, the management apparatus may exclude the input image 205 from enrollment in operation 260.

When it is determined in operation 220 that the detected object is a single user, the management apparatus may determine a liveness of the input image 205 in operation 230. "Liveness" may correspond to whether an image (the input image 205) is a real image or a spoofed image. Here, "spoofing" refers to fake biometric information other than live biometric information, and may be construed as including, for example, duplication, forgery, and falsification of biometric information (e.g., a face image).

When it is determined that the input image 205 is not an actually captured image but a duplicated or forged photo or movie, or a mask with the face of the user drawn, the management apparatus may determine that the input image 205 is a spoofed image. When it is determined in operation 230 that the input image 205 is a spoofed image, the management apparatus may exclude the input image 205 from enrollment in operation 260.

When it is determined in operation 230 that the input image 205 is a real image, the management apparatus may perform a user verification by the face region of the input image 205 in operation 240. When the user verification is failed in operation 240, the management apparatus may exclude the input image 205 from enrollment in operation 260.

When the user verification is successful in operation 240, the management apparatus may enroll the input image 205 in an enrollment DB in operation 250. An image enrolled in the enrollment DB may be utilized in a future user verification process and compared to an input image. The enrollment DB may store, for example, an enrolled image itself, and/or may store features of a face region included in the enrolled image. The features of the face region may be stored in the form of a feature vector or a feature map. However, examples are not necessarily limited thereto. A non-limiting example of the process of performing a user verification by the management apparatus will be described in more detail with reference to FIG. 7.

Figure 3:
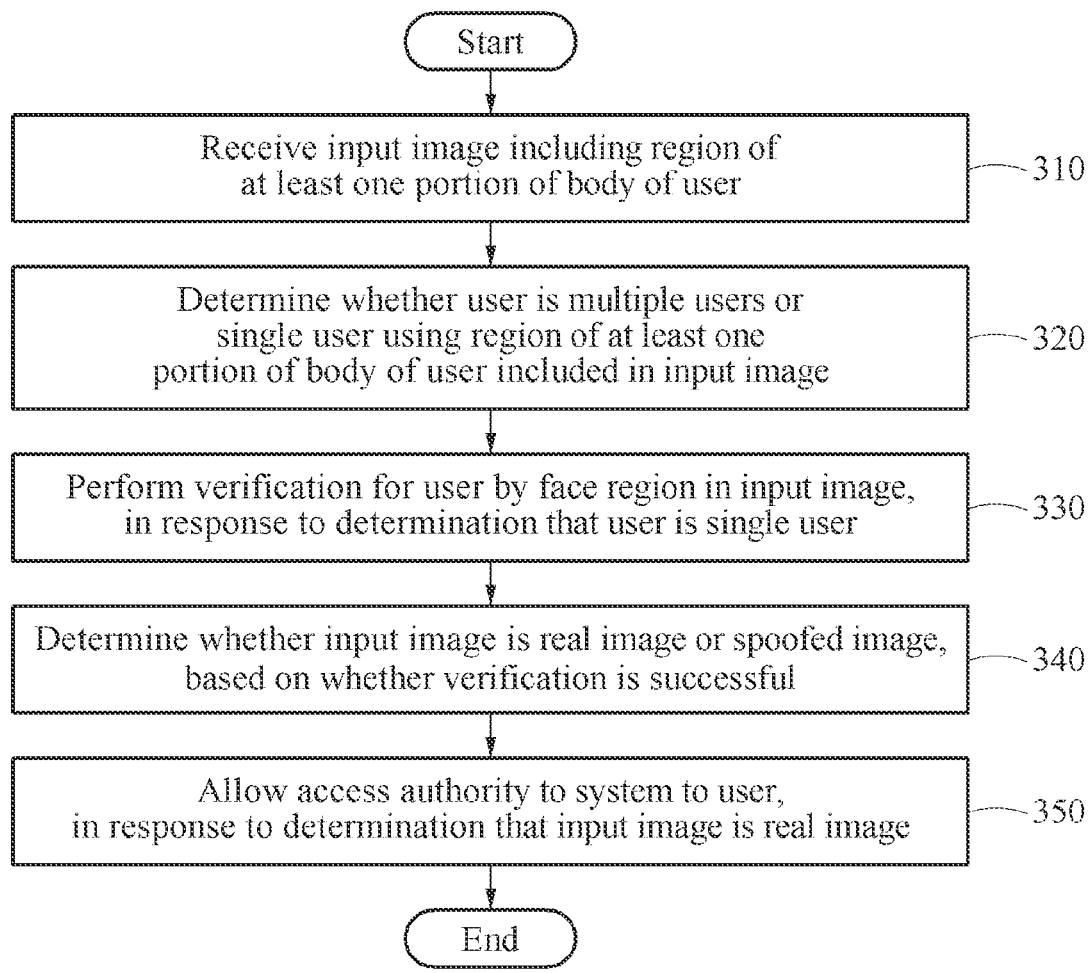
FIG. 3 illustrates an example of a method of managing an access authority.

FIG. 3 illustrates an example of a method of managing an access authority. In the following example, operations may be performed sequentially, but not necessarily performed sequentially. For example, the operations may be performed in different orders, and at least two of the operations may be performed in parallel.

Referring to FIG. 3, a process of allowing an access authority to a system to a user by a management apparatus through operations 310 to 350 is illustrated.

In operation 310, the management apparatus receives an input image including a region of at least one portion of a body of a user. The input image may be, for example, an image obtained by capturing a working situation of the user who is telecommuting. The input image may be a two-dimensional image or a three-dimensional image.

In operation 310, the management apparatus may receive the input image according to a preset time interval, or may receive the input image according to a random time interval. According to an embodiment, the management apparatus may receive the input image at a time interval in which a predetermined time interval and a random time interval are mixed.

In operation 320, the management apparatus determines whether the user is multiple users or a single user using the region of the at least one portion of the body included in the input image received in operation 310. For example, the management apparatus may determine whether the user is multiple users or a single user based on at least one of a number of the region of the at least one portion of the body, a color of the region of the at least one portion of the body, a position of disposition of the region of the at least one portion of the body compared to a position of a face region, an angle of disposition, and/or a size ratio of the region of the at least one portion of the body to the face region.

For example, when the number of regions of at least one portion of the body (e.g., arms or hands) included in the input image exceeds the normal number of body parts (e.g., "3" exceeding a preset normal number "2" for arms or hands), the management apparatus may determine that the user included in the input image is multiple users. Alternatively or additionally, when a color difference between body parts of the user exceeds a predetermined standard, such as when the color of the arm of the user included in the input image is dark brown whereas the color of the face of the user is a lighter hue, for example, yellow or white, the management apparatus may determine that the user included in the input image is multiple users. In addition, when the position of disposition of the region of the at least one portion of the body (e.g., the arm or neck) compared to the position of the face region included in the input image, the angle of disposition, and/or the size ratio of the region of the at least one portion of the body to the face region (e.g., a thickness ratio of an arm or neck region compared to the size of the face region) exceed a position of disposition, an angle of disposition, and/or a size ratio of typical users, the management apparatus may determine that the user included in the input image is multiple users.

When it is determined in operation 320 that the user included in the input image is multiple users, the management apparatus may block an access authority of the user to the system.

In operation 330, the management apparatus performs a verification for the user by the face region in the input image in response to the determination of operation 320 (e.g., the determination that the user is a single user). In operation 330, the management apparatus may extract a feature vector of the face region from the input image. The management apparatus may perform the verification for the user based on a result of comparing the feature vector of the face region to an enrolled feature vector stored in an enrollment DB. For example, the management apparatus may perform the verification for the user based on a result of comparing a similarity score between the feature vector of the face region and the enrolled feature vector stored in the enrollment DB to a verification threshold. In this case, the management apparatus may adjust the verification threshold to be high or low according to a security level corresponding to the system.

For example, the security level corresponding to the system may range from the lowest level "0" to the highest level "10". When the security level corresponding to the system is set to "Level 8" which is higher than a reference level (e.g., "Level 5"), the management apparatus may adjust the verification threshold to be higher than a default value (or an initial verification threshold). Conversely, when the security level corresponding to the system is set to "Level 3" which is lower than the reference level, the management apparatus may adjust the verification threshold to be lower than the default value. The management apparatus may perform the verification for the user according to whether the similarity score is greater than the adjusted verification threshold. In other words, when the similarity score between the feature vector of the face region and the enrolled feature vector stored in the enrollment DB is greater than or equal to the verification threshold adjusted according to the security level of the system, the management apparatus may determine that the user verification is successful. When the similarity score is less than the verification threshold adjusted according to the security level of the system, the management apparatus may determine that the user verification is failed. When the verification performed in operation 330 is failed, the management apparatus may block the access authority of the user to the system.

In operation 340, the management apparatus determines whether the input image is a real image or a spoofed image based on whether the verification performed in operation 330 is successful. In operation 340, the management apparatus may extract an output feature vector of a neural network by applying the input image to the neural network configured to detect whether a face region is spoofed from the input image. The management apparatus may calculate a score based on the output feature vector. The management apparatus may determine whether the input image is a real image or a spoofed image according to whether the calculated score falls within a threshold range for determining whether the input image is spoofed. When it is determined in operation 340 that the input image is a spoofed image, the management apparatus may block the access authority of the user to the system.

According to an example, the management apparatus may adjust the threshold range according to the security level corresponding to the system (e.g., when the security level corresponding to the system is adjusted). In this case, the management apparatus may determine whether the input image is a real image or a spoofed image according to whether the score falls within the adjusted threshold range.

The management apparatus may adjust the level of determination difficulty by changing the verification threshold for determining whether the verification is successful in operation 330 and/or the threshold range for determining a liveness in operation 340 according to the security level corresponding to the system, thereby more flexibly regulating the trade-off between usability and security. Alternatively or additionally, according to an example, the management apparatus may guide (e.g., instruct) the user to transmit an image (e.g., a panoramic image (video) or a single image) of a space outside a field of view corresponding to the input image by rotating a capturing device used to capture the input image and capturing the space, according to the security level corresponding to the system. For example, the management apparatus may cause the user to transmit an image of a space outside a field of view of a webcam used to capture the input image by capturing the space using a separate capturing device. The management apparatus may enhance the security by checking whether there is another user through the image captured by the separate capturing device.

In operation 350, the management apparatus may allow an access authority to the system to the user, in response to the determination of operation 340 (e.g., the determination that the input image is a real image). According to an example, the management apparatus may determine whether a preset type of capturing device (e.g., a camera, a cell phone, a pen-type capturing device, and/or a pin-type capturing device) is detected in the input image, and block an access authority of the user to the system in response to the determination that a capturing device is detected.

According to an example, the management apparatus may additionally verify whether the input image is captured by a capturing device with a polarizing film attached to narrow a field of view. The management apparatus may verify, in response to the user wearing glasses, whether the input image is captured by a capturing device with a polarizing film attached to narrow a field of view, based on at least one of a pattern and a color reflected on a lens of the glasses corresponding to the input image. For example, the management apparatus may verify whether the input image is captured by a capturing device with a polarizing film attached to narrow a field of view, according to a degree of deformation of the pattern or color reflected on the lens of the glasses. However, examples are not necessarily limited thereto.

Figure 4:
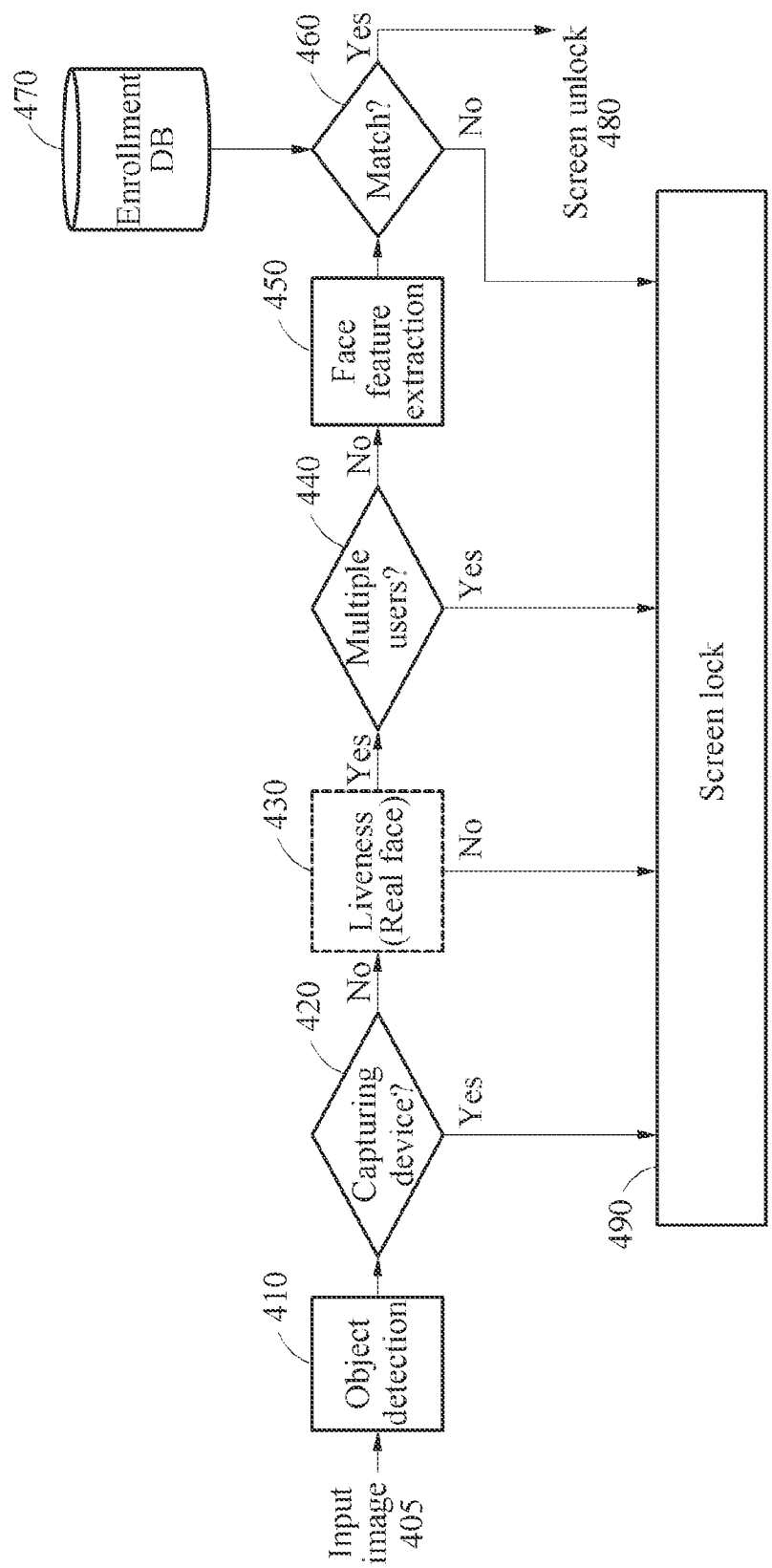
FIG. 4 illustrates an example of a detection process performed for allowing an access authority to a system by a management apparatus.

FIG. 4 illustrates an example of a detection process performed for allowing an access authority to a system by a management apparatus. Referring to FIG. 4, a process of detecting a capturing device and multiple users from an input image 405 by a management apparatus is illustrated.

In operation 410, a management apparatus may detect an object from the input image 405. For example, the management apparatus may detect, from the input image 405, whether a region of at least one portion of a body of a user, a capturing device, and/or a face is included.

In operation 410, the management apparatus may detect a region of at least one portion of a body of a user, a capturing device, and/or a face using a neural network pre-trained to detect a region of at least one portion of a body of a user, a capturing device, and/or a face. In this case, the neural network may determine the number and positions of objects included in the input image 405 through bounding boxes corresponding to classes of the respective objects (e.g., a region of at least one portion of a body of a user, a capturing device, and/or the like) and transmit the determined number and positions of the objects to the management apparatus.

In operation 420, the management apparatus may determine whether a preset type of capturing device is among the objects detected in operation 410. In response to the determination that a preset type of capturing device is detected in operation 420, the management apparatus may block an access authority of the user to a system by locking a screen provided to the user, in operation 490.

In response to the determination that a preset type of capturing device is not detected in operation 420, the management apparatus may determine a liveness of the input image 405, that is, whether the input image 405 is a real image or a spoofed image, in operation 430.

In operation 430, for example, when the input image 405 is not an actually captured image but a duplicated or forged photo or movie, or a mask with the face of the user drawn, the management apparatus may determine that the input image 405 is a spoofed image. When it is determined in operation 430 that the input image 405 is a spoofed image, the management apparatus may block the access authority of the user to the system by locking the screen provided to the user, in operation 490.

When it is determined in operation 430 that the input image 405 is a real image, the management apparatus may determine whether the input image 405 includes multiple users, in operation 440. In operation 440, as described above, the management apparatus may determine whether the user included in the input image 405 is multiple users or a single user based on at least one of a number of the region of the at least one portion of the body included in the input image 405, a color of the region of the at least one portion of the body included in the input image 405, positions of dispositions of regions of other portions of the body compared to a position of a face region in the input image 405, angles of dispositions, and/or a size ratio of the region of the at least one portion of the body to the face region.

When it is determined in operation 440 that the input image 405 includes multiple users, the management apparatus may block the access authority of the user to the system by locking the screen provided to the user, in operation 490.

When it is determined in operation 440 that the input image 405 includes a single user, the management apparatus may extract a face feature of the user from the face region included in the input image 405, in operation 450. The management apparatus may extract the face feature of the user, for example, in the form of a feature vector or a feature map. However, examples are not necessarily limited thereto.

In operation 460, the management apparatus may compare the feature extracted in operation 450 with an enrolled feature stored in an enrollment DB 470. In this case, the enrolled feature stored in the enrollment DB 470 may correspond to a feature vector or a feature map of an enrolled image. However, examples are not necessarily limited thereto.

When it is determined that a comparison result in operation 460 is a match, the management apparatus may allow the access authority to the system to the user by unlocking the screen, in operation 480. Here, "a comparison result is a match" may be construed as including both a case in which the feature extracted in operation 450 is completely the same as the enrolled feature stored in the enrollment DB 470 and a case in which the features have a similarity within the margin of error acceptable to acknowledge they are the same.

When it is determined that the comparison result in operation 460 is not a match, the management apparatus may block the access authority to the system by locking the screen provided to the user, in operation 490.

Figure 5:
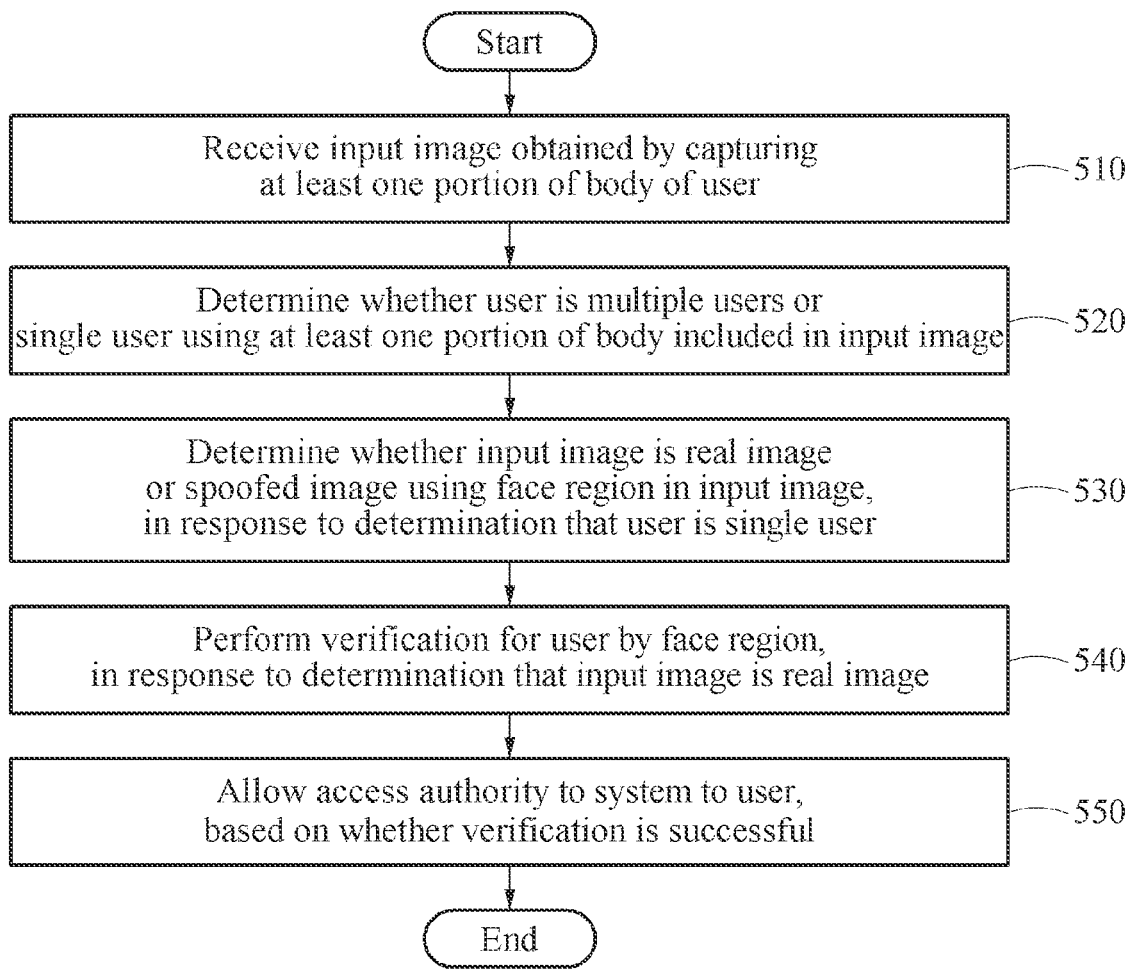
FIG. 5 illustrates an example of a method of managing an access authority.

FIG. 5 illustrates an example of a method of managing an access authority. In the following example, operations may be performed sequentially, but not necessarily performed sequentially. For example, the operations may be performed in different orders, and at least two of the operations may be performed in parallel.

Referring to FIG. 5, a process of allowing an access authority to a system to a user by a management apparatus through operations 510 to 550 is illustrated.

In operation 510, the management apparatus receives an input image obtained by capturing at least one portion of a body of a user.

In operation 520, the management apparatus determines whether the user is multiple users or a single user using the at least one portion of the body included in the input image received in operation 510. When it is determined in operation 520 that the user is multiple users, the management apparatus may block an access authority of the user to the system.

In operation 530, the management apparatus determines whether the input image is a real image or a spoofed image using a face region in the input image, in response to the determination of operation 520 (e.g., the determination that the user is a single user). When it is determined in operation 530 that the input image is a spoofed image, the management apparatus may block the access authority of the user to the system.

In operation 540, the management apparatus performs a verification for the user by the face region, in response to the determination of operation 530 (e.g., the determination that the input image is a real image). When the verification for the user is failed in operation 540, the management apparatus may block the access authority of the user to the system.

In operation 550, the management apparatus allows the access authority to the system to the user based on whether the verification performed in operation 540 is successful.

Figure 6:
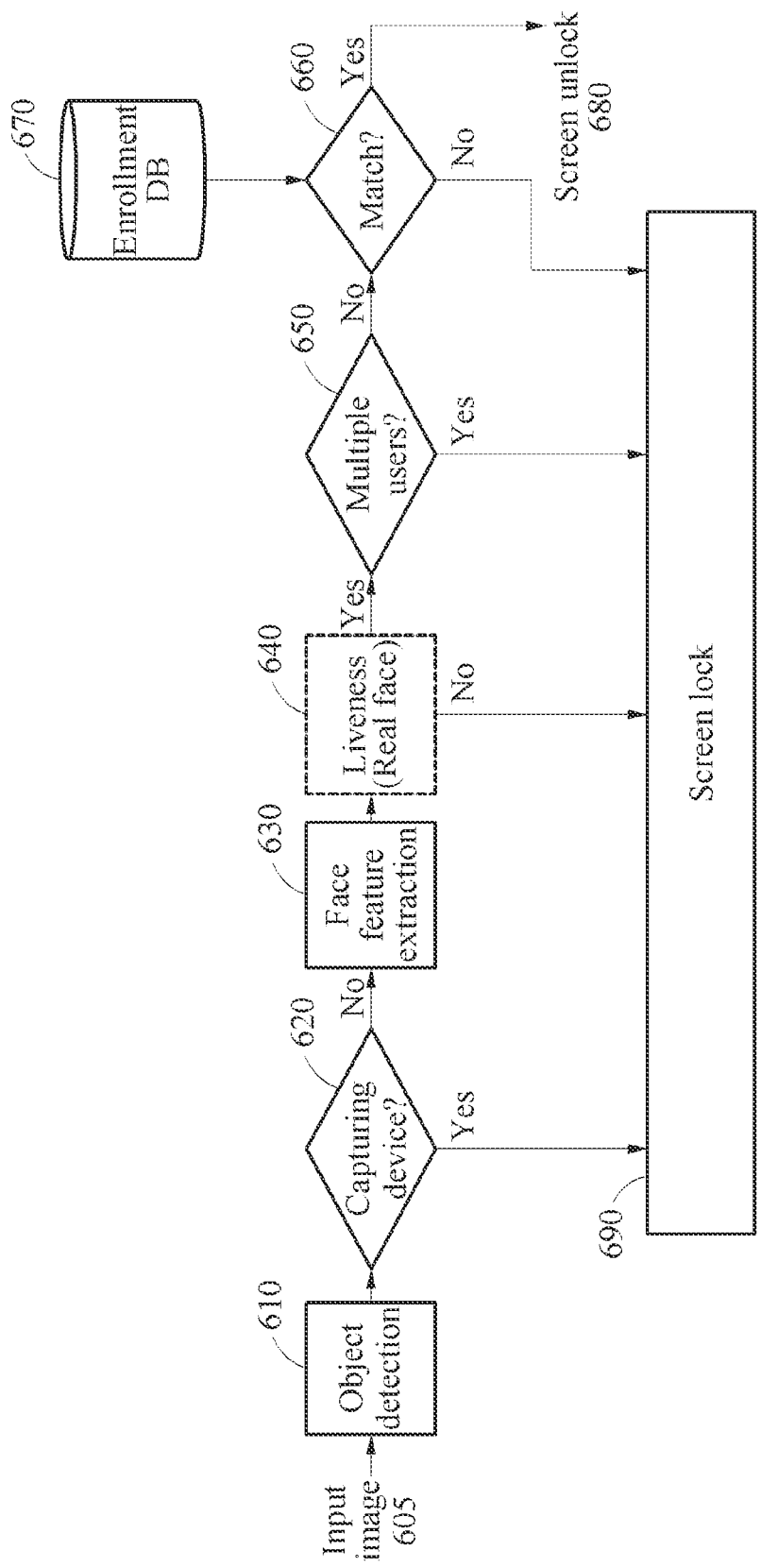
FIG. 6 illustrates an example of a detection process performed for allowing an access authority to a system by a management apparatus.

FIG. 6 illustrates an example of a detection process performed for allowing an access authority to a system by a management apparatus. Referring to FIG. 6, a process of detecting a capturing device and multiple users from an input image 605 by a management apparatus is illustrated.

In operation 610, a management apparatus may detect an object from the input image 605. For example, the management apparatus may detect, from the input image 605, whether a region of at least one portion of a body of a user, a capturing device, and/or a face is included.

In operation 610, similar to operation 410 described above, the management apparatus may detect a region of at least one portion of a body of a user, a capturing device, and/or a face using a neural network pre-trained to detect a region of at least one portion of a body of a user, a capturing device, and/or a face.

In operation 620, the management apparatus may determine whether a preset type of capturing device is among the objects detected in operation 610. In response to the determination that a preset type of capturing device is detected in operation 620, the management apparatus may block an access authority of the user to a system by locking a screen provided to the user, in operation 690.

In response to the determination that a preset type of capturing device is not detected in operation 620, the management apparatus may extract a face feature of the user from a face region included in the input image, in operation 630. In this case, the management apparatus may extract the face feature of the user in the form of a feature vector or a feature map. However, examples are not necessarily limited thereto.

In operation 640, the management apparatus may determine a liveness of the input image 605, that is, whether the input image 605 is a real image or a spoofed image, using the face feature of the user extracted in operation 630. When it is determined in operation 640 that the input image 605 is a spoofed image, the management apparatus may block the access authority of the user to the system by locking the screen provided to the user, in operation 690.

When it is determined in operation 640 that the input image 605 is a real image, the management apparatus may determine whether the input image 605 includes multiple users, in operation 650. In operation 650, as described above through operation 320 of FIG. 3, the management apparatus may determine whether the user included in the input image 605 is multiple users or a single user based on at least one of a number of the region of the at least one portion of the body included in the input image 605, a color of the region of the at least one portion of the body included in the input image 605, positions of dispositions of regions of other portions of the body compared to a position of a face region in the input image 605, angles of dispositions, and/or a size ratio of the region of the at least one portion of the body to the face region.

When it is determined in operation 650 that the input image 605 includes multiple users, the management apparatus may block the access authority of the user to the system by locking the screen provided to the user, in operation 690.

When it is determined in operation 650 that the input image 605 includes a single user, the management apparatus may compare the feature extracted in operation 630 with an enrolled feature stored in an enrollment DB 670, in operation 660. In this case, the enrolled feature stored in the enrollment DB 670 may correspond to a feature vector or a feature map of an enrolled image. However, examples are not necessarily limited thereto.

When it is determined that a comparison result in operation 660 is a match, the management apparatus may allow the access authority to the system to the user by unlocking the screen, in operation 680. Here, "a comparison result is a match" may be construed as including both a case in which the feature extracted in operation 630 is completely the same as the enrolled feature stored in the enrollment DB 670 and a case in which the features have a similarity within the margin of error acceptable to acknowledge they are the same.

When it is determined that the comparison result in operation 660 is not a match, the management apparatus may block the access authority to the system by locking the screen provided to the user, in operation 690.

Figure 7:
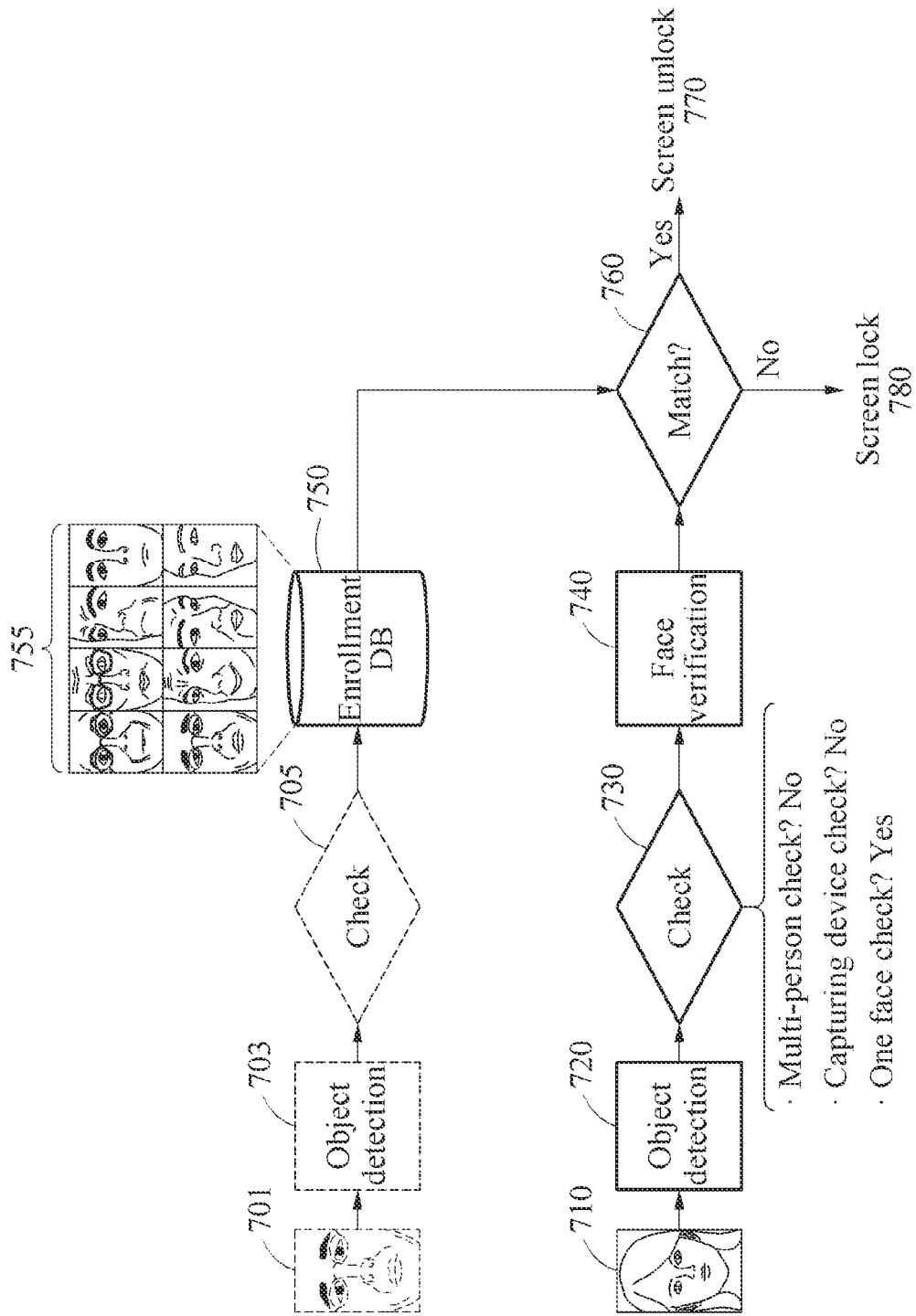
FIG. 7 illustrates an example of a process of performing a verification for a user by a management apparatus.

FIG. 7 illustrates an example of a process of performing a verification for a user by a management apparatus. Referring to FIG. 7, a process of verifying whether a user B included in an input image 710 has an access authority to a system by matching the input image 710 with enrolled images 755 stored in an enrollment DB 750 by a management apparatus is illustrated.

For example, when the input image 710 including a face of the user B is received, the management apparatus may perform object detection on the input image 710, in operation 720. In operation 730, the management apparatus may check whether object(s) detected in operation 720 correspond to predetermined conditions (e.g., whether the object(s) correspond to multiple users, correspond to a capturing device, and/or include a face region). When it is checked in operation 730 that the detected object(s) correspond to any one of the predetermined conditions, the management apparatus may skip a face verification on the input image 710, and block the access authority of the user to the system by immediately lock the screen in operation 780.

When it is checked in operation 730 that the detected object(s) do not correspond to the predetermined conditions, the management apparatus may perform a face verification for the detected object, in operation 740.

In operation 760, the management apparatus may compare the input image 710 with the enrolled images 755 stored in the enrollment DB 750 for the face verification on the input image 710. In this case, the enrolled images 755 stored in the enrollment DB 750 may correspond to images of an authorized user A 701. Similar to operations 720 and 730, the enrolled images 755 may be enrolled in the enrollment DB 750 when it is checked that the images of the user A 701 do not correspond to the predetermined conditions, as a result of performing the process of objection detection 703 and check 705 on the images of the user A 701.

When it is determined that the input image 710 matches the enrolled images 755 according to a comparison result of operation 760, the management apparatus may allow the access authority of the user to the system by unlocking the screen, in operation 770.

When it is determined that the input image 710 does not match the enrolled images 755 according to the comparison result of operation 760, the management apparatus may block the access authority of the user to the system by locking the screen, in operation 780.

In the example of FIG. 7, since the input image 710 does not match the enrolled images 755, the management apparatus may block the access authority of the user B to the system through screen lock.

Figure 8:
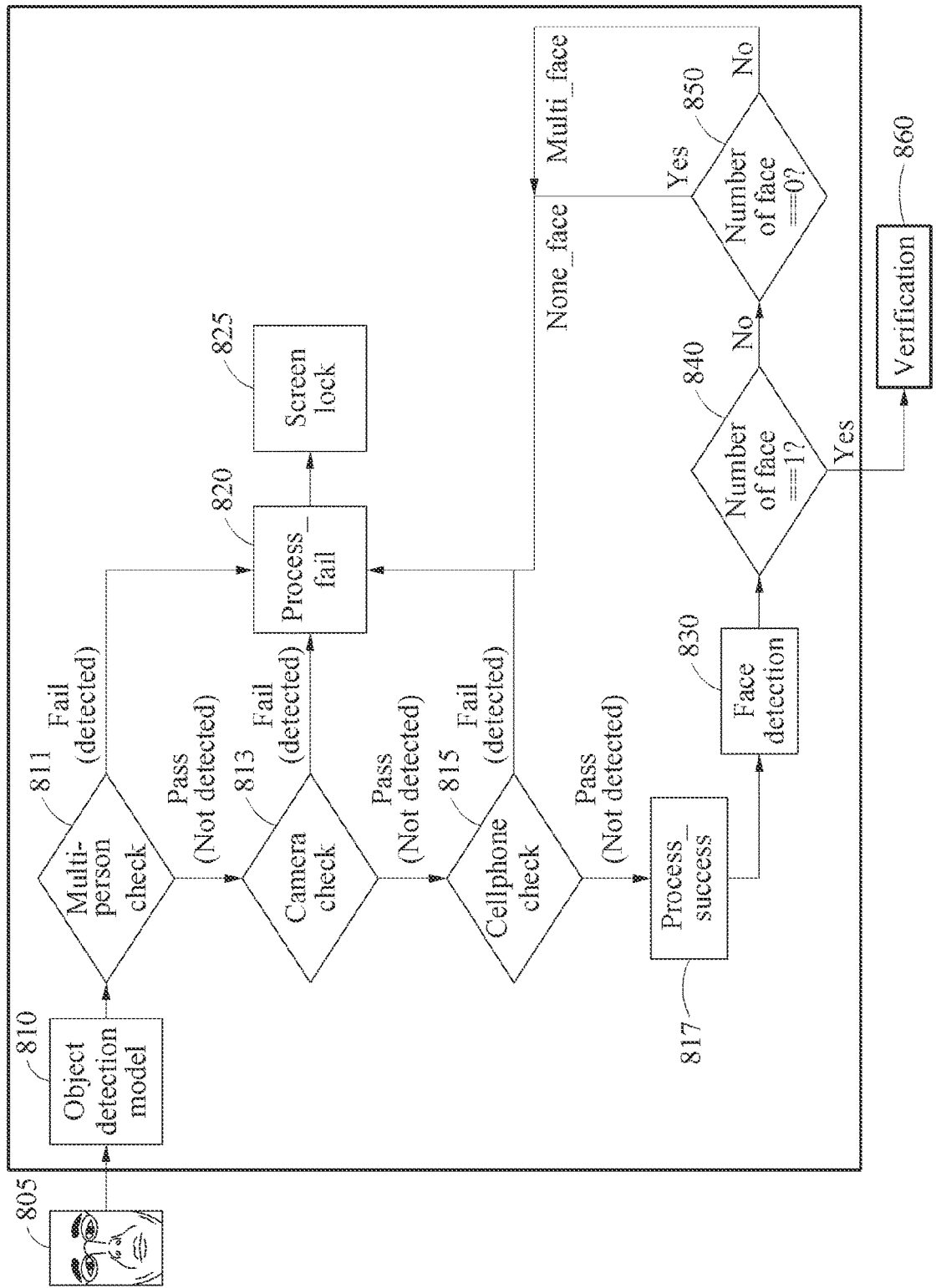
FIGS. 8 to 10 illustrate examples of detecting a user, a capturing device, and/or multiple users by a management apparatus.

FIG. 8 illustrates an example of a process of detecting a user by a management apparatus. Referring to FIG. 8, a process of performing object and face detection on an input image 805 by a management apparatus prior to performing a verification 860 for a user corresponding to the input image 805 is illustrated.

When the input image 805 is received, the management apparatus may detect an object using an object detection model 810. The object detection model 810 may detect an object by, for example, separate neural networks trained to detect multiple users, cameras, and cell phones, respectively. Alternatively or additionally, the object detection model 810 may detect an object through a single neural network trained to classify classes of objects detected by bounding boxes into multiple users, cameras, and cell phones.

More specifically, in operation 811, the management apparatus may check whether multiple users are detected in the input image 805 using the object detection model 810. When multiple users are detected in operation 811, the management apparatus may determine that the process is failed in operation 820, and lock a screen in operation 825.

When multiple users are not detected in operation 811, the management apparatus may check whether a camera is detected in the input image 805 using the object detection model 810, in operation 813. When a camera is detected in operation 813, the management apparatus may determine that the process is failed in operation 820, and lock the screen in operation 825.

When a camera is not detected in operation 813, the management apparatus may check whether a cell phone is detected in the input image 805 using the object detection model 810, in operation 815. When a cell phone is detected in operation 815, the management apparatus may determine that the process is failed in operation 820, and lock the screen in operation 825.

When a cell phone is not detected in operation 815, the management apparatus may determine that the process is successful in operation 817, and perform face detection in operation 830. In operation 830, the management apparatus may detect a face region in the input image 805.

In operation 840, the management apparatus may determine whether the number of face regions detected in operation 830 is "1". When it is determined in operation 840 that the number of face regions is "1", the management apparatus may perform a verification for the user corresponding to the input image 805, in operation 860.

Conversely, when it is determined in operation 840 that the number of face regions is not "1", the management apparatus may determine whether the number of face regions is "0", in operation 850. When it is determined in operation 850 that the number of face regions is "0", the management apparatus may not perform a verification for the user since a face region is not detected. Thus, the management apparatus may determine that the process is failed in operation 820, and lock the screen in operation 825. In addition, when it is determined in operation 850 that the number of face regions is not "0", it means that the number of face regions is greater than or equal to "2". Thus, the management apparatus may determine that the process is failed in operation 820, and lock the screen in operation 825.

Figure 9:
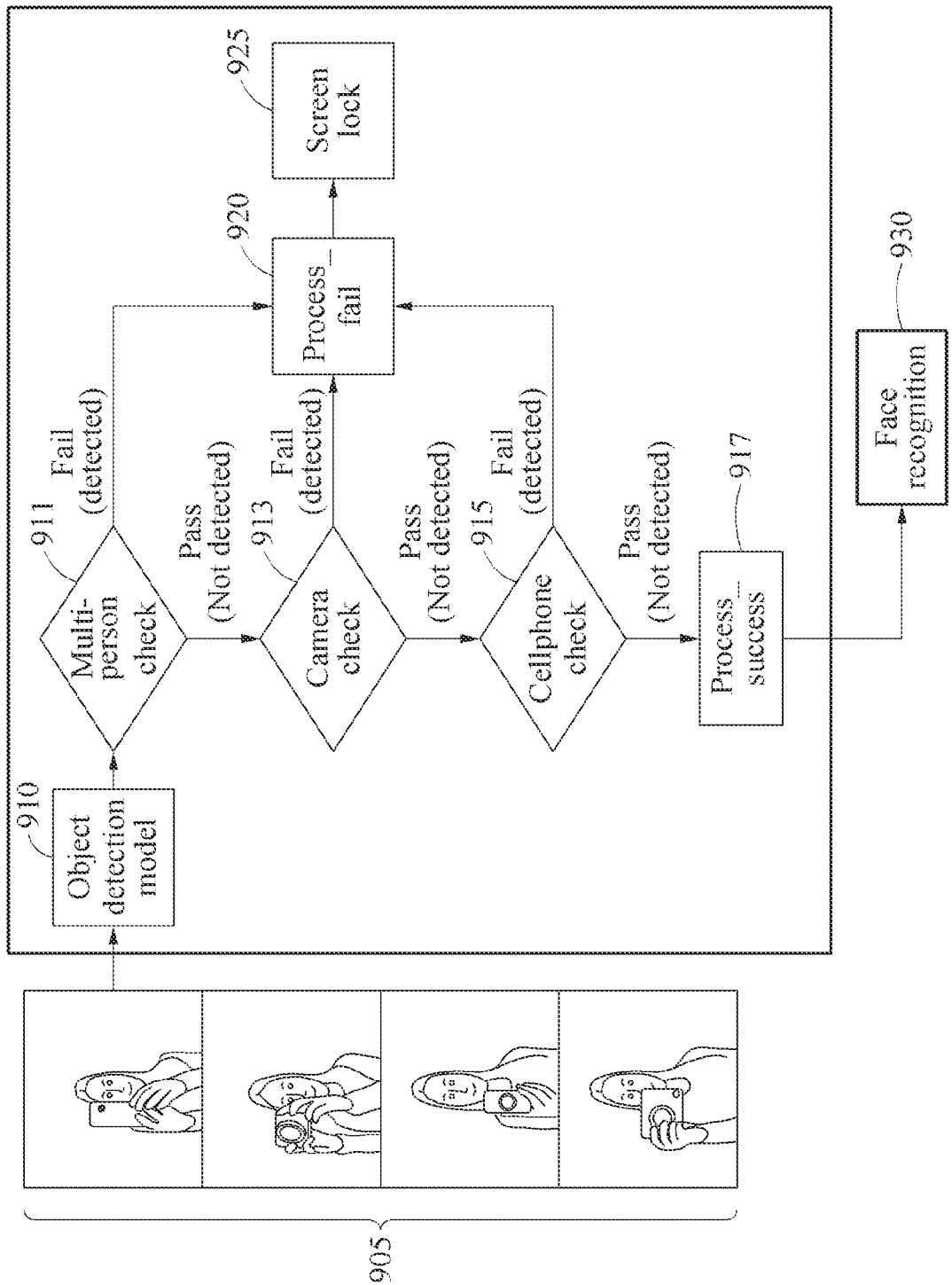

FIG. 9 illustrates an example of a process of detecting a capturing device by a management apparatus. Referring to FIG. 9, a process of detecting various types of capturing device(s) by a management apparatus prior to performing a face recognition from input image(s) 905 is illustrated.

When an input image 905 is received, the management apparatus may detect an object using an object detection model 910. The object detection model 910 may detect an object by, for example, separate neural networks trained to detect multiple users, cameras, and cell phones, respectively. Alternatively or additionally, the object detection model 910 may detect an object through a single neural network trained to classify classes of objects detected by bounding boxes into multiple users, cameras, and cell phones.

More specifically, in operation 911, the management apparatus may check whether multiple users are detected in the input image 905 using the object detection model 910. When multiple users are detected in operation 911, the management apparatus may determine that the process is failed in operation 920, and lock a screen in operation 925.

When multiple users are not detected in operation 911, the management apparatus may check whether a camera is detected in the input image 905 using the object detection model 910, in operation 913. In this case, the object detection model 910 may be trained to detect a typical type of camera with a protruding camera lens as well as a modified type of camera with a hidden camera lens, for example, a pen-type camera, a pin-type camera, and/or a bag-type camera.

Further, in operation 913, the management apparatus may check or determine whether a capturing action of a user corresponding to a camera is detected in addition to a camera in the input image 905. The management apparatus may determine whether a capturing action of the user is detected based on whether at least one of a pose of the user, a gesture of the user, a position of the capturing device, or consecutive motions of the user corresponding to the camera corresponds to a motion suspected as (e.g., predetermined to be) a capturing action.

The management apparatus may determine that a pose of the user facing a screen provided through a system (e.g., a pose of holding a camera in a hand, or a pose of pressing a shutter), a gesture of the user (e.g., a gesture of pressing a shutter or button of a camera), a position of a capturing device corresponding to the screen (e.g., a position of a capturing device facing the screen in the front), and/or consecutive motions of the user using a capturing device (e.g., consecutive motions of capturing the screen at a distance close to the screen and then, changing a page displayed on the screen to the next page, and capturing the screen displaying the next page again) correspond to a motion suspected as a capturing action. However, examples are not necessarily limited thereto.

When a camera and/or a capturing action of the user using the camera is detected in operation 913, the management apparatus may determine that the process is failed in operation 920, and lock the screen in operation 925.

When a camera is not detected in operation 913, the management apparatus may check whether a cell phone is detected in the input image 905 using the object detection model 910, in operation 915. Further, similar to operation 913, the management apparatus may check (determine) whether a capturing action of the user corresponding to the cell phone is detected in the input image 905, in operation 915. The management apparatus may determine whether a capturing action of the user is detected based on whether at least one of a pose of the user, a gesture of the user, a position of the capturing device, or consecutive motions of the user corresponding to the cell phone corresponds to a motion suspected as a capturing action.

When a cell phone and/or a capturing action of the user using the cell phone is detected in operation 915, the management apparatus may determine that the process is failed in operation 920, and lock the screen in operation 925.

When a cell phone is not detected in operation 915, the management apparatus may determine that the process is successful in operation 917, and perform face recognition in operation 930.

In operation 930, the management apparatus may verify whether a region of at least one portion of a body of the detected user in the input image 905 is a face region of an authorized user (e.g., the user A).

Figure 10:
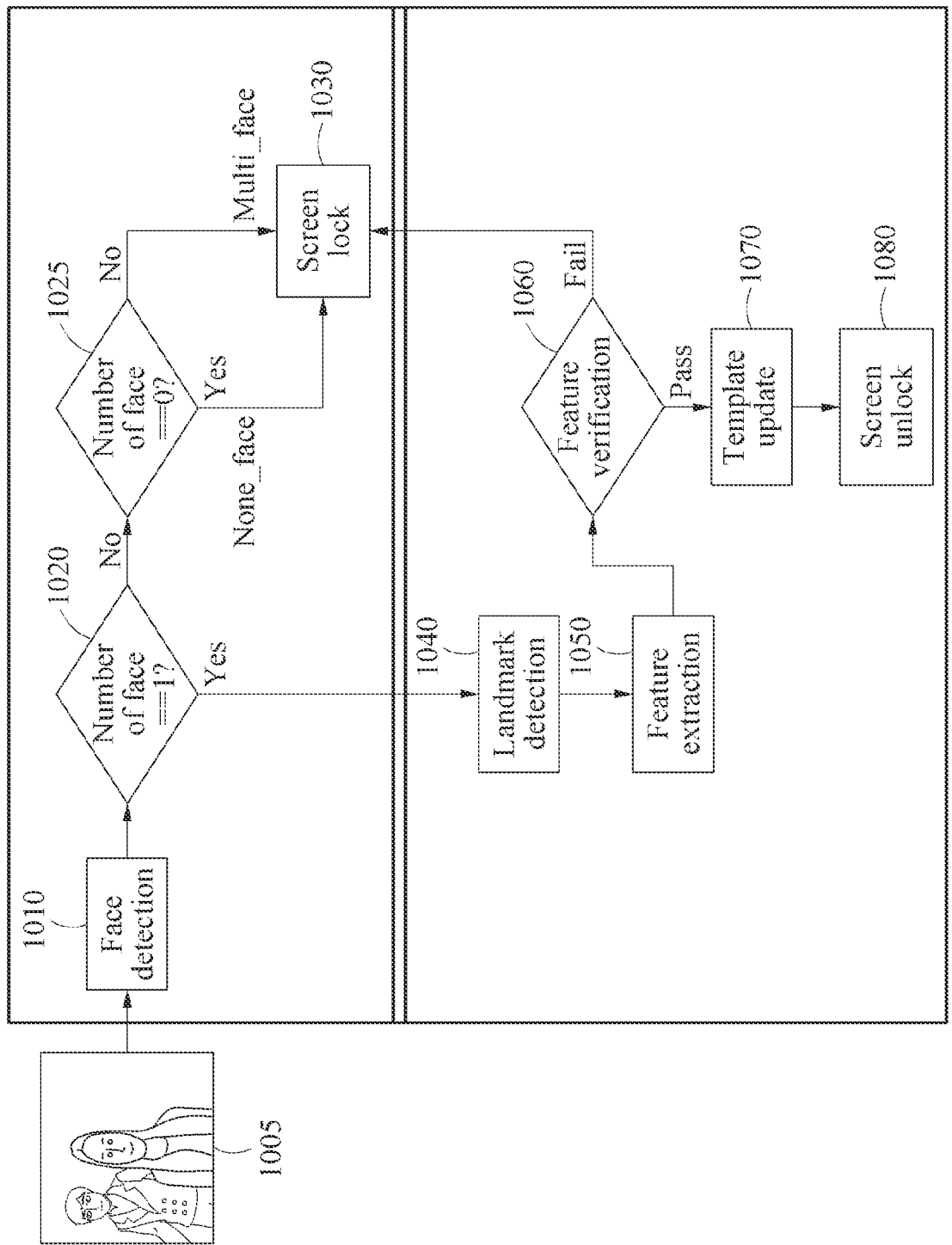

FIG. 10 illustrates an example of a process of detecting multiple users by a management apparatus. Referring to FIG. 10, a process of performing a user verification by a management apparatus by detecting a face region from an input image 1005 including two users is illustrated.

When an input image 1005 is received, the management apparatus may perform face detection, in operation 1010. In operation 1010, the management apparatus may detect a face region in the input image 1005.

In operation 1020, the management apparatus may determine whether the number of face regions detected in operation 1010 is "1". When it is determined in operation 1020 that the number of face regions is not "1", the management apparatus may determine whether the number of face regions is "0", in operation 1025. When it is determined in operation 1025 that the number of face regions is "0", the management apparatus may not perform a verification for the user since a face region is not detected. Accordingly, the management apparatus may determine that the process is failed and lock a screen in operation 1030. In addition, when it is determined in operation 1025 that the number of face regions is not "0", it means that the number of face regions is greater than or equal to "2", in other words, that an authorized user is with an unauthorized user. Thus, the management apparatus may determine that the process is failed and lock the screen in operation 1030.

Conversely, when it is determined in operation 1020 that the number of face regions is "1", the management apparatus may detect landmarks from the face region detected in operation 1010, in operation 1040. "Landmarks" may refer to points, in the input image 1005, that have remarkable color or brightness changes and thus may express features of the whole image. The landmarks may also be referred to as "feature points".

In operation 1050, the management apparatus may extract features of the face region in the input image 1005 according to the landmarks detected in operation 1040. In operation 1050, the management apparatus may extract the features for example, in the form of a feature vector or a feature map. However, examples are not necessarily limited thereto.

In operation 1060, the management apparatus may perform a feature verification by the features extracted in operation 1050. When the features extracted in operation 1050 match features of the authorized user stored in an enrollment DB, the management apparatus may determine that the verification is successful in operation 1060, and update a template by the input image 1005 in operation 1070.

When the features extracted in operation 1050 do not match the features of the authorized user stored in the enrollment DB, the management apparatus may determine that the verification is failed in operation 1060, and lock the screen in operation 1030.

Figure 11:
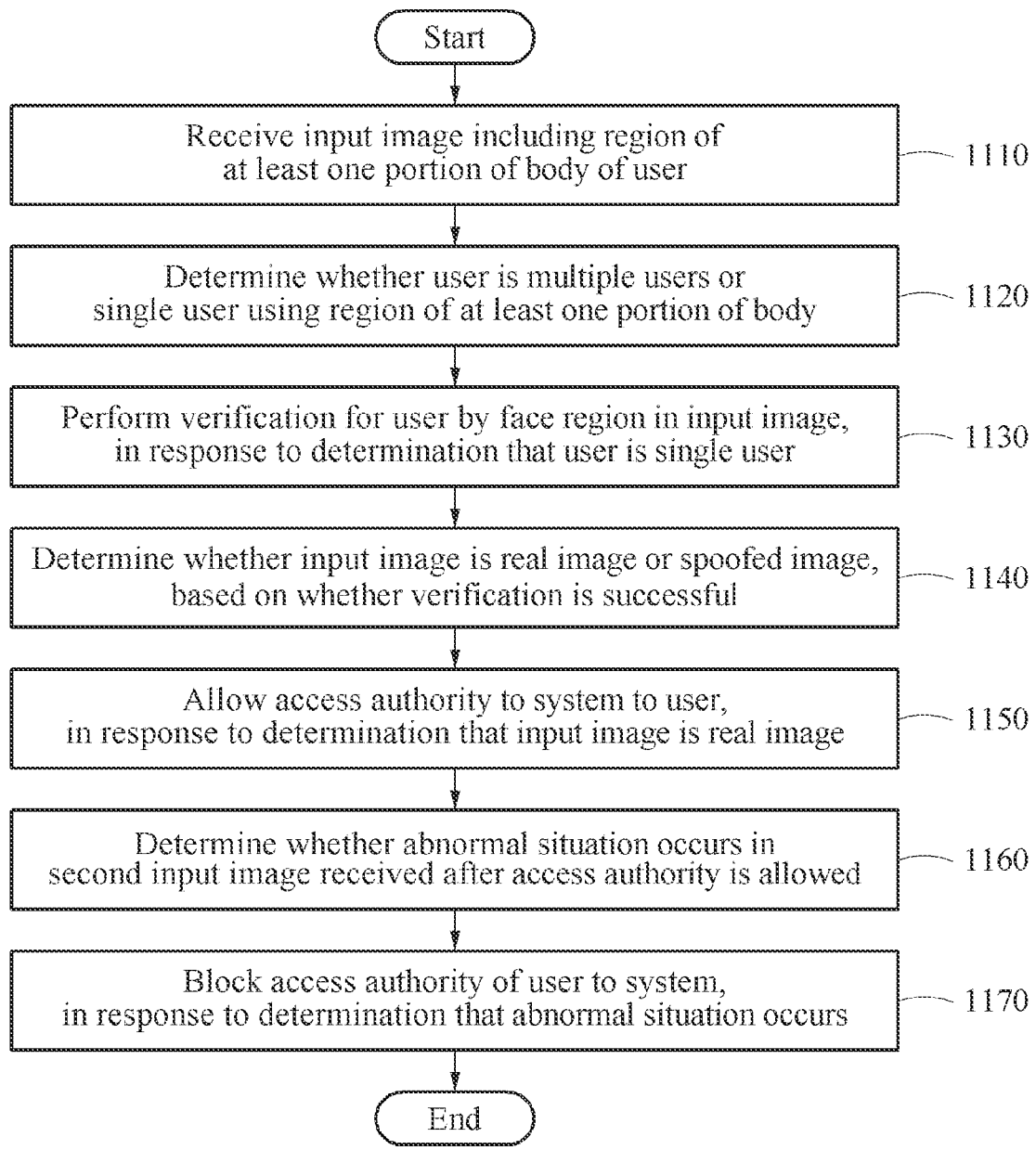
FIG. 11 illustrates an example of a method of managing an access authority.

FIG. 11 illustrates an example of a method of managing an access authority. In the following example, operations may be performed sequentially, but not necessarily performed sequentially. For example, the operations may be performed in different orders, and at least two of the operations may be performed in parallel.

Referring to FIG. 11, a process of allowing an access authority to a system to a user by a management apparatus through operations 1110 to 1170 is illustrated.

In operation 1110, the management apparatus receives an input image including a region of at least one portion of a body of a user.

In operation 1120, the management apparatus may determine whether the user is multiple users or a single user using the region of the at least one portion of the body.

In operation 1130, the management apparatus may perform a verification for the user by a face region in the input image in response to the determination of operation 1120 (e.g., the determination that the user is a single user).

In operation 1140, the management apparatus may determine whether the input image is a real image or a spoofed image based on whether the verification performed in operation 1130 is successful.

In operation 1150, the management apparatus may allow an access authority to the system to the user, in response to the determination of operation 1140 (e.g., the determination that the input image is a real image).

In operation 1160, the management apparatus may determine whether an abnormal situation occurs in a second input image received after the access authority is allowed in operation 1150. Here, the "abnormal situation" may be construed as a situation in which it is determined that an authorized user and/or an unauthorized user attempts to leak information from the system. The abnormal situation may include, for example, a situation in which at least one of another user other than the authorized user, a preset type of capturing device, or a capturing action using a capturing device is detected in the second input image. However, examples are not necessarily limited thereto.

In operation 1160, the management apparatus may determine whether an unauthorized user is detected based on the number of face regions included in the second input image received after the access authority is allowed. When a plurality of face regions are detected in the second input image, the management apparatus may determine that another user (e.g., an unauthorized user) is detected. When an unauthorized user is detected, the management apparatus may determine that an abnormal situation occurs.

In operation 1160, the management apparatus may determine whether an object corresponding to the preset type of capturing device is detected in the second input image. Alternatively or additionally, the management apparatus may determine whether a capturing action of the user corresponding to the preset type of capturing device is detected in the second input image. For example, the management apparatus may determine whether a capturing action of the user is detected, based on whether at least one of a pose of the user facing a screen provided through the system, a gesture of the user, a position of the capturing device corresponding to the screen, or a motion of the user using the capturing device in the second input image corresponds to a motion suspected as a capturing action.

In operation 1170, the management apparatus may block the access authority of the user to the system in response to the determination of operation 1160 (e.g., the determination that an abnormal situation occurs).

Figure 12:
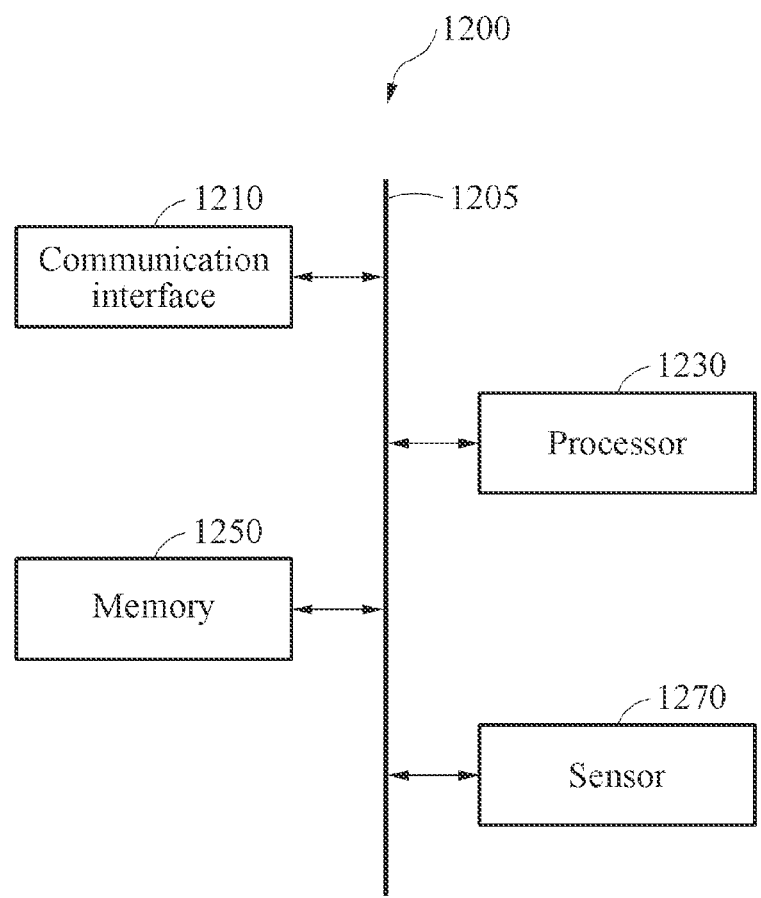
FIG. 12 illustrates an example of an apparatus for managing an access authority.

FIG. 12 illustrates an example of an apparatus for managing an access authority. Referring to FIG. 12, a management apparatus 1200 may include a communication interface 1210, a processor 1230 (e.g., one or more processors), a memory 1250 (e.g., one or more memories), and a sensor 1270 (e.g., one or more sensors). The communication interface 1210, the processor 1230, and the memory 1250 may be connected to each other through a communication bus 1205.

The communication interface 1210 may receive (e.g., from the sensor 1270) an input image including at least one portion of a body of a user. The input image may be, for example, an image captured by the sensor 1270, an image captured by an image sensor in a terminal of the user who is telecommuting, or an image captured by a CCTV, or a camera in a laptop computer or a desktop computer provided in a place of work of the user. The sensor 1270 may be or include an image sensor such as a camera that captures the input image.

The communication interface 1210 may transmit, to an outside of the management apparatus 1200, a result of determining whether the user included in the input image is multiple users, a result of performing a verification for the user, and a result of determining whether the input image is a real image, performed by the processor 1230.

The processor 1230 may determine whether the user is multiple users or a single user using a region of the at least one portion of the body included in the input image received through the communication interface 1210. The processor 1230 may perform a verification for the user by a face region in the input image, in response to the determination that the user is a single user. The processor 1230 may determine whether the input image is a real image or a spoofed image based on whether the verification is successful. The processor 1230 may allow an access authority to the system to the user, in response to the determination that the input image is a real image.

Alternatively or additionally, according to an example, the processor 1230 may determine whether the input image is a real image or a spoofed image using the face region in the input image, in response to the determination that the user is a single user. In this case, the processor 1230 may perform a verification for the user by the face region, in response to the determination that the input image is a real image. The processor 1230 may allow an access authority to the system to the user based on whether the verification is successful.

The processor 1230 may execute a program and control the management apparatus 1200. Program codes to be executed by the processor 1230 may be stored in the memory 1250.

The memory 1250 may store the input image received from the communication interface 1210. Further, the memory 1250 may store a variety of information generated in the processing process of the processor 1230 described above. In addition, the memory 1250 may store a variety of data and programs. The memory 1250 may include a volatile memory or a non-volatile memory. The memory 1250 may include a large-capacity storage medium such as a hard disk to store the variety of data.

The management apparatus 1200 may be, for example, a telecommuting security system or a device that performs similar functions thereto.

In addition, the processor 1230 may perform the at least one method described with reference to FIGS. 1 through 11 or a scheme corresponding to the at least one method. The processor 1230 may be a management apparatus implemented by hardware including a circuit having a physical structure to perform desired operations. For example, the desired operations may include code or instructions included in a program. The hardware-implemented management apparatus 1200 may include, for example, a microprocessor, a central processing unit (CPU), a graphics processing unit (GPU), a processor core, a multi-core processor, a multi-processor, an application-specific integrated circuit (ASIC), a field-programmable gate array (FPGA), and a neural processing unit (NPU).

The management apparatuses, enrollment DBs, communication interfaces, processors, memories, sensors, communication buses, management apparatus 100, enrollment DB 470, enrollment DB 670, enrollment DB 770, management apparatus 1200, communication interface 1210, processor 1230, memory 1250, sensor 1270, communication bus 1205, and other apparatuses, devices, units, modules, and components described herein with respect to FIGS. 1-12 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A method with access authority management, the method comprising:
    receiving an input image comprising a region of at least one portion of a body of a user;
    determining whether the user corresponds to multiple users or a single user using the region of the at least one portion of the body;
    performing a verification for the user based on a face region in the input image, in response to the determination that the user is the single user;
    determining whether the input image is a real image or a spoofed image based on whether the verification is successful;
    determining whether a preset type of capturing device is detected in the input image; and
    allowing an access authority to a system to the user, in response to the determination that the input image is the real image and the determination that the preset type of capturing device is not detected in the input image.

2. The method of claim 1, wherein the determining of whether the user corresponds to the multiple users or the single user comprises determining whether the user corresponds to the multiple users or the single user based on any one or any combination of any two or more of a number of the region of the at least one portion of the body, a color of the region of the at least one portion of the body, a position of disposition of the region of the at least one portion of the body compared to a position of the face region, an angle of disposition, and a size ratio of the region of the at least one portion of the body to the face region.

3. The method of claim 1, wherein the performing comprises:
    extracting a feature vector of the face region from the input image; and
    performing the verification for the user based on a result of comparing a similarity score between the feature vector of the face region and an enrolled feature vector stored in an enrollment database to a verification threshold.

4. The method of claim 3, further comprising adjusting the verification threshold according to a security level corresponding to the system,
    wherein the performing comprises performing the verification for the user according to whether the similarity score is greater than the adjusted verification threshold.

5. The method of claim 1, wherein the determining of whether the input image is the real image or the spoofed image comprises:
    extracting an output feature vector of a neural network for detecting whether the face region is spoofed from the input image;
    calculating a score based on the output feature vector; and
    determining whether the input image is the real image or the spoofed image according to whether the score falls within a threshold range for determining whether the input image is spoofed.

6. The method of claim 5, further comprising adjusting the threshold range according to a security level corresponding to the system,
    wherein the determining of whether the input image is the real image or the spoofed image comprises determining whether the input image is the real image or the spoofed image according to whether the score falls within the adjusted threshold range.

7. The method of claim 1, further comprising:
    blocking an access authority to the system in response to the determination that the preset type of capturing device is detected.

8. The method of claim 1, further comprising:
    determining whether an abnormal situation is detected in a second input image received after the access authority is allowed, the abnormal situation including any one or any combination of any two or more of another user other than the authorized system, the preset type of capturing device, and a capturing action using the capturing device; and blocking an access authority to the system in response to the determination that an abnormal situation is detected.

9. The method of claim 8, wherein the determining of whether the abnormal situation is detected comprises determining whether the other user is detected based on whether a plurality of face regions are detected in the second input image.

10. The method of claim 8, wherein the determining of whether the abnormal situation is detected comprises determining whether an object corresponding to the preset type of capturing device is detected in the second input image.

11. The method of claim 8, wherein the determining of whether the abnormal situation is detected comprises determining whether the capturing action, being of the user and corresponding to the preset type of capturing device, is detected in the second input image.

12. The method of claim 11, wherein the determining of whether the capturing action of the user is detected comprises determining whether the capturing action of the user is detected based on whether any one or any combination of any two or more of a pose of the user facing a screen provided through the system, a gesture of the user, a position of the capturing device corresponding to the screen, and consecutive motions of the user using the capturing device in the second input image corresponds to a motion predetermined as a capturing action.

13. The method of claim 1, further comprising guiding the user to transmit an image of a space outside a field of view corresponding to the input image by rotating a capturing device used to capture the input image and capturing the space, according to a security level corresponding to the system.

14. The method of claim 1, further comprising verifying whether the input image is captured by a capturing device with a polarizing film attached to narrow a field of view.

15. The method of claim 14, wherein the verifying comprises verifying, in response to the user wearing glasses, whether the input image is captured by a capturing device with a polarizing film attached to narrow a field of view, based on either one or both of a pattern and a color reflected on a lens of the glasses corresponding to the input image.

16. The method of claim 1, wherein the receiving of the input image comprises either one or both of:

receiving the input image according to a preset time interval; and receiving the input image according to a random time interval.

17. The method of claim 1, wherein the input image comprises an image obtained by capturing a working situation of the user who is telecommuting.

18. A non-transitory computer-readable storage medium storing instructions that, when executed by a processor, configure the processor to perform the method of claim 1.

19. A method with access authority management, the method comprising:

receiving an input image obtained by capturing at least one portion of a body of a user;

determining whether the user corresponds to multiple users or a single user using the at least one portion of the body;

determining whether the input image is a real image or a spoofed image using a face region in the input image, in response to the determination that the user is the single user;

performing a verification for the user by the face region, in response to the determination that the input image is the real image;

determining whether a preset type of capturing device is detected in the input image; and allowing an access authority to a system to the user based on whether the verification is successful and the determination that the preset type of capturing device is not detected in the input image.

20. An apparatus with access authority management, the apparatus comprising:

a communication interface configured to receive an input image comprising a region of at least one portion of a body of a user; and a processor configured to:

determine whether the user corresponds to multiple users or a single user using the region of the at least one portion of the body;

perform a verification for the user based on a face region in the input image, in response to the determination that the user is the single user;

determine whether the input image is a real image or a spoofed image based on whether the verification is successful;

determining whether a preset type of capturing device is detected in the input image; and allow an access authority to a system to the user, in response to the determination that the input image is the real image and the determination that the preset type of capturing device is not detected in the input image.

21. The apparatus of claim 20, wherein, for the determining of whether the user corresponds to the multiple users or the single user, the processor is further configured to determine whether the user corresponds to the multiple users or the single user based on any one or any combination of any two or more of a number of the region of the at least one portion of the body, a color of the region of the at least one portion of the body, a position of disposition of the region of the at least one portion of the body compared to a position of the face region, an angle of disposition, and a size ratio of the region of the at least one portion of the body to the face region.

22. The apparatus of claim 20, wherein, for the performing, the processor is further configured to:

extract a feature vector of the face region from the input image; and perform the verification for the user based on a result of comparing a similarity score between the feature vector of the face region and an enrolled feature vector stored in an enrollment database to a verification threshold.

23. The apparatus of claim 22, wherein the processor is further configured to:

adjust the verification threshold according to a security level corresponding to the system; and for the performing, perform the verification for the user according to whether the similarity score is greater than the adjusted verification threshold.

24. The apparatus of claim 20, wherein, for the determining of whether the input image is the real image or the spoofed image, the processor is further configured to:
- extract an output feature vector of a neural network for detecting whether the face region is spoofed from the input image;
- calculate a score based on the output feature vector; and
- determine whether the input image is the real image or the spoofed image according to whether the score falls within a threshold range for determining whether the input image is spoofed.

25. The apparatus of claim 24, wherein the processor is further configured to:
- adjust the threshold range according to a security level corresponding to the system; and
- for the determining of whether the input image is the real image or the spoofed image, determine whether the input image is the real image or the spoofed image according to whether the score falls within the adjusted threshold range.

26. The apparatus of claim 20, wherein the processor is further configured to:
- block an access authority of the system in response to the determination that the preset type of capturing device is detected.

27. The apparatus of claim 20, wherein the processor is further configured to:
- determine whether an abnormal situation is detected in a second input image received after the access authority is allowed, the abnormal situation including any one or any combination of any two or more of another user other than the authorized system, the preset type of capturing device, and a capturing action using the capturing device; and
- block an access authority to the system in response to the determination that an abnormal situation is detected.

28. The apparatus of claim 27, wherein, for the determining of whether the abnormal situation is detected, the processor is further configured to determine whether the other user is detected based on whether a plurality of face regions are detected in the second input image.

29. The apparatus of claim 27, wherein, for the determining of whether the abnormal situation is detected, the processor is further configured to determine whether an object corresponding to the preset type of capturing device is detected in the second input image.

30. The apparatus of claim 27, wherein, for the determining of whether the abnormal situation is detected, the processor is further configured to determine whether the capturing action, being of the user and corresponding to the preset type of capturing device, is detected in the second input image.

31. The apparatus of claim 30, wherein, for the determining of whether the capturing action of the user is detected, the processor is further configured to determine whether the capturing action of the user is detected, based on whether any one or any combination of any two or more of a pose of the user facing a screen provided through the system, a gesture of the user, a position of the capturing device corresponding to the screen, and a motion of the user using the capturing device in the second input image corresponds to a motion suspected as a capturing action.

32. The apparatus of claim 20, wherein the processor is further configured to guide the user to transmit an image of a space outside a field of view corresponding to the input image by rotating a capturing device used to capture the input image and capturing the space, according to a security level corresponding to the system.

33. The apparatus of claim 20, wherein the processor is further configured to verify whether the input image is captured by a capturing device with a polarizing film attached to narrow a field of view.

34. The apparatus of claim 33, wherein the processor is further configured to verify, in response to the user wearing glasses, whether the input image is captured by a capturing device with a polarizing film attached to narrow a field of view, based on either one or both of a pattern and a color reflected on a lens of the glasses corresponding to the input image.

35. The apparatus of claim 20, wherein, for the receiving of the input image, the processor is further configured to receive either one or both of the input image according to a preset time interval and the input image according to a random time interval.

* * * * *